United States Patent

Eastman

[15] 3,707,159
[45] Dec. 26, 1972

[54] FLUID PRESSURE RATION SENSING DEVICE

[72] Inventor: James M. Eastman, South Bend, Ind.

[73] Assignee: The Bendix Corporation

[22] Filed: March 24, 1971

[21] Appl. No.: 127,685

[52] U.S. Cl. ............................................. 137/81.5
[51] Int. Cl. ............................................. F15c 1/12
[58] Field of Search .............................. 137/81.5

[56] References Cited

UNITED STATES PATENTS

| | | | |
|---|---|---|---|
| 3,587,606 | 6/1971 | Howland | 137/81.5 |
| 3,473,545 | 10/1969 | Boyadjieff | 137/81.5 |
| 3,489,009 | 1/1970 | Rimmer | 137/81.5 X |
| 3,515,158 | 6/1970 | Utz | 137/81.5 |
| 3,537,466 | 11/1970 | Chapin | 137/81.5 |
| 3,576,291 | 4/1971 | Taplin | 137/81.5 X |
| 3,578,013 | 5/1971 | Brochard | 137/81.5 |
| 3,592,209 | 7/1971 | Joby | 137/81.5 |
| 3,592,213 | 7/1971 | Smith | 137/81.5 X |
| 3,603,334 | 9/1971 | Davies et al. | 137/81.5 |

*Primary Examiner*—Samuel Scott
*Attorney*—Gordon H. Chenez and Plante, Hartz, Smith & Thompson

[57] ABSTRACT

A pressure ratio sensing device for generating an output fluid pressure differential signal in proportion to the ratio of two sensed fluid pressures. The output differential signal is derived from a pressurized supply fluid which flows subsonically through a first restriction, a second restriction defining a power jet for a dual output proportional acting fluidic amplifier having opposed control fluid ports, a vortex amplifier having a radial supply port and a tangential control port, and a third restriction to the lower of the two sensed fluid pressures. The fluid pressure intermediate the first and second restrictions is controlled to maintain the same in excess of the higher of the two sensed fluid pressures. The higher of the two sensed pressures is applied to one of the opposed control fluid ports of the proportional amplifier to bias the power jet thereof toward one of the dual outputs which, in turn, is vented to the tangential port of the vortex amplifier. The remaining of the dual outputs is vented to the radial supply port of the vortex amplifier as well as to the second of the control ports of the proportional amplifier. The pressure drop across the third restriction provides the output pressure differential signal which varies in proportion to the ratio of the sensed two fluid pressures. The effective flow area of the third restriction is such that the pressure differential thereacross does not exceed the expected minimum pressure of the lower of the two sensed fluid pressures.

8 Claims, 1 Drawing Figure

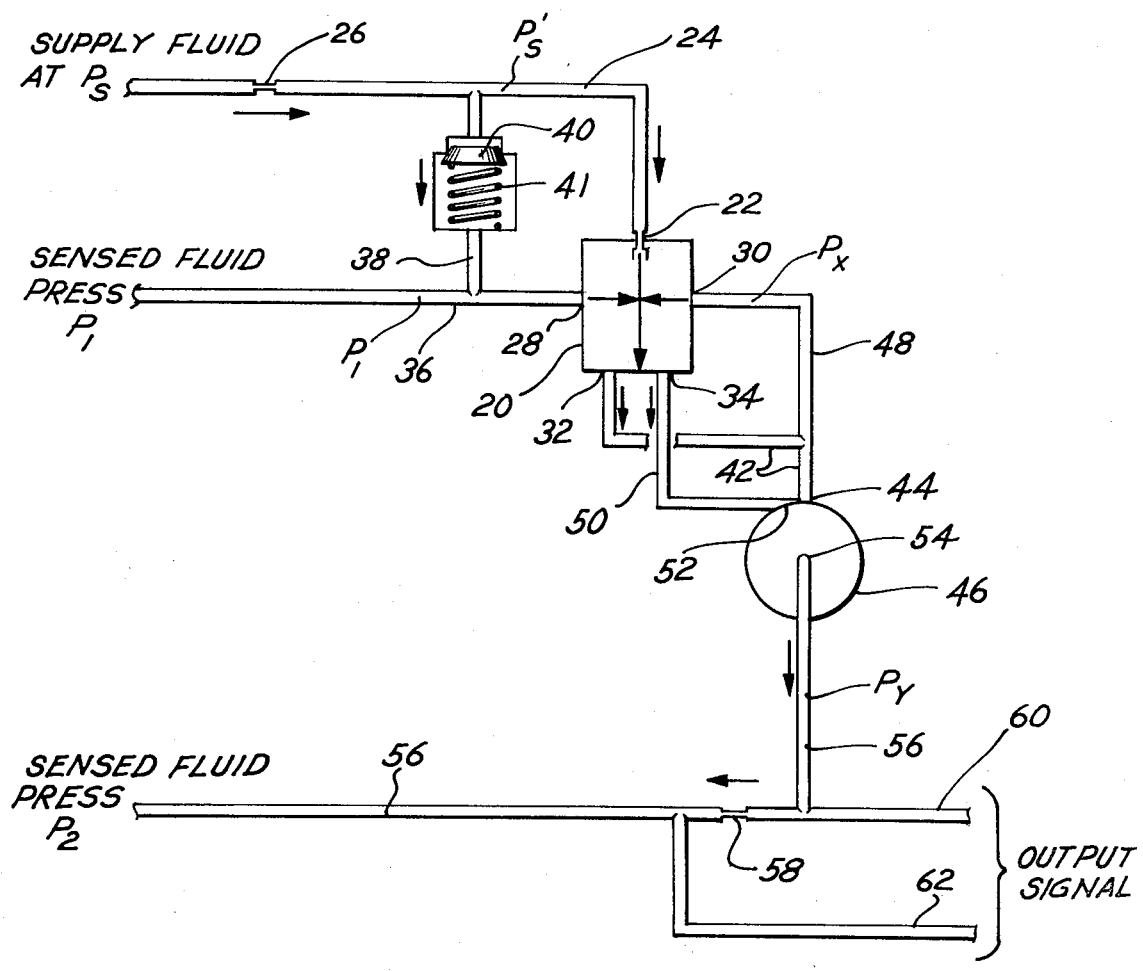

FLUID PRESSURE RATION SENSING DEVICE

BACKGROUND OF THE INVENTION

Pneumatic pressure ratio sensing devices exist in various forms for use in control operations such as that associated with gas turbine engines wherein air pressure ratios across an air compressor and/or turbine are related to engine performance. Reference is made to U.S. Pat. Nos. 3,270,561; 3,444,875 and 3,489,009 for example of such prior art pneumatic pressure ratio sensing devices. The pneumatic pressure ratio sensing devices of which I am aware are not entirely satisfactory for various reasons which include the use of fluidic amplifiers having a tailored function generating output characteristic, provide a pulse frequency output signal or are limited to single point or very narrow ratio range operation. Sensing devices which are analog in operation are limited in accuracy as a result of a limited range of curve shapes that can be effectively achieved and maintained over a reasonable range of operating conditions including pressure and/or temperatures of the fluids involved. Sensing devices having pulse frequency operation normally require a fixed frequency reference pressure which is difficult to achieve and requires complex pulse frequency comparing and analog conversion circuits to render the same useful in certain applications.

SUMMARY OF THE INVENTION

The present invention provides a fluidic pressure ratio sensing network adapted to provide an analog pressure output signal accurately and reliably over a wide range of temperatures and pressures of the fluids sensed.

The present invention provides a fluidic pressure ratio sensing device having a plurality of fluid restrictions in series flow relationship with first and second fluidic amplifiers wherein the principle of operation is dependent upon the fluid pressure relationship derived from restrictions in series and having subsonic gas flow therethrough.

BRIEF DESCRIPTION OF THE DRAWINGS

The drawing is a schematic representation of a fluidic pressure ratio sensing network embodying the present invention.

DESCRIPTION OF THE PREFERRED EMBODIMENT

Referring to the drawings, numeral 20 designates a conventional proportional type fluid amplifier which is preferably of the high input impedance type shown and described in U. S. Pat. No. 3,486,520 in the name of J. M. Hyer et al. (common assignee). The fluid amplifier 20 is provided with a restricted inlet port 22 connected via a passage 24 to a suitable source of pressurized gas such as air at pressure $P_S$ which passage 24 contains a flow restriction 26. Pressurized air discharged by inlet port 22 defines a power jet which passes between opposed control gas ports 28 and 30 to outlet ports 32 and 34 which are pressurized to a greater or lesser degree relative to each other depending upon the degree of deflection of the power jet in response to the control pressure differential $P_1 - P_X$ established between control ports 28 and 30.

The control port 28 is vented via a passage 36 to a gas source at pressure $P_1$. A passage 38 connecting passage 24 with passage 36 is provided with a pressure responsive valve 40 urged toward a closed position by a compression spring 41 in opposition to the force derived from the pressure differential $P_S' - P_1$ imposed on valve 40 thereby maintaining the gas pressure $P_S'$ intermediate restriction 26 and inlet port 22 at a predetermined amount greater than $P_1$, as will be described.

The outlet port 32 is vented via a passage 42 to radially directed inlet port 44 of a conventional vortex throttling type amplifier 46 which may be of the type shown and described in U. S. Pat. No. 3,195,303 in the name of G. M. Widell (common assignee). A branch passage 48 connects passage 42 to control port 30. A passage 50 connects outlet port 34 to a control port 52 located to direct gas flow tangentially into amplifier 46 to thereby generate a vortex flow within the same which impedes flow from inlet port 44 to a centrally located outlet port 54 of amplifier 46 thereby establishing a corresponding output flow at a pressure $P_y$. The outlet port 54 is vented via a passage 56 to fluid at pressure $P_2$ which is the lower of the two sensed fluid pressures. The passage 56 is provided with a flow restriction 58 across which a pressure differential $P_y - P_2$ is generated. Suitable pressure taps or passages 60 and 62 connected to passage 56 upstream and downstream, respectively, relative to restriction 58 may be connected to suitable pressure responsive sensing or control apparatus, not shown, for sensing or control purposes.

It will be understood that the pressure $P_S$ of the supply air is maintained at a value in excess of the gas pressure $P_1$ by an amount at least as great as the minimum absolute value of $P_1$ expected to encountered during operation. The pressure $P_S'$ downstream from restriction 26 having an effective flow area $A_1$ is controlled by the valve 40 which under the influence of pressure $P_1$ and the force of spring 41 in opposition to the pressure $P_S'$ acting thereagainst vents air from passage 24 to passage 36 to maintain $P_S'$ a predetermined fixed amount above the expected minimum pressure $P_1$. Thus, the relationship $P_S' = P_1 + K_1$ wherein $K_1 \leqq P_1$ (MIN) may be established, thereby maintaining a subsonic flow condition for the amplifier power jet.

The restriction 58 is selected with an effective flow area $A_5$ across which the pressure differential $P_y - P_2$ does not exceed the expected minimum value of $P_2$ thereby maintaining a subsonic flow condition of restriction 58.

The power jet flow of amplifier 20 is proportioned between outlet ports 32 and 34 in response to the differential between control pressures $P_1$ and $P_X$. The flow out of outlet port 32 is directed to inlet port 44 of amplifier 46. The flow out of outlet port 34 is directed to control port 52 resulting in a corresponding vortex flow in amplifier 46 which impedes the flow from inlet port 44 to outlet port 54 causing the back pressure $P_X$ to increase or decrease accordingly to reduce the control pressure differential $P_1 - P_X$ at control ports 28 and 30 to zero. As pointed out heretofore, the amplifier 20 is preferably of the high input impedance type such that little or no flow out of control ports 28 and 30 is entrained by the power jet passing therebetween. As shown, the amplifier is unvented. Should venting be found desirable, the amplifier should be vented to the pressure $P_X$.

The flow out of outlet port 54 passes through restriction 58 across which the resulting $P_y - P_2$ pressure differential is sensed via passages 60 and 62.

It will be noted that essentially the same flow passes through inlet port 22 of amplifier 20 and restriction 58. Since subsonic flow exists through inlet port 22 and restriction 58, the well known Fleigner's flow equation may be applied resulting in the following relationship:

$$1.06 C_{22} A_{22} \sqrt{P_X \frac{(P_S' - P_X)}{T_S'}} = 1.06 C_{58} A_{58} \sqrt{P_2 \frac{(P_y - P_2)}{T_y}} \quad (1)$$

wherein $C_{22}$ and $C_{58}$ represent conventional flow coefficients for restricted inlet port 22 and restriction 58, respectively, and $T_S'$ and $T_y$ represent the temperature of the air or gas at pressure $P_S'$ and $P_y$, respectively.

Since the temperatures $T_S'$ and $T_y$ can be shown to be substantially equal and the flow coefficients $C_{22}$ and $C_{58}$ can be made nearly equal by design, the equation (1) may be reduced to:

$$P_y - P_2 = (A_{22}/A_{58})^2 (P_S' - P_X)(P_X/P_2) \quad (2)$$

As pointed out above $P_S' = P_1 + K_1$ and $P_X = P_1$ which by substitution in equation (2) results in:

$$P_y - P_2 = K_1(P_1/P_2)(A_{22}/A_{58})^2 \quad (3)$$

Since $A_{22}$ and $A_{58}$ are constant, equation (3) may be rewritten:

$$P_y - P_2 = K_2(P_1/P_2) \text{ wherein } K_2 \text{ is a constant equivalent to } K_1 (A_{22}/A_{58})^2. \quad (4)$$

It is readily apparent from Equation (4) that the pressure differential $P_y - P_2$ sensed across restriction 58 provides an output signal which varies in proportion to the ratio of the pressures $P_1$ and $P_2$.

I claim:

1. Fluid pressure ratio sensing apparatus adapted to provide an output pressure signal in proportion to the ratio of two sensed fluid pressures, said apparatus comprising:
    a source of fluid at a pressure in excess of both of said two sensed fluid pressures;
    a flow conduit including first and second flow restrictions in series flow relationship connecting said source with one of said two sensed fluid pressures;
    fluid amplifier means responsive to the second of said two sensed fluid pressures operatively connected to said flow conduit intermediate and in series flow relationship with said first and second restrictions for controlling fluid flow therebetween to thereby vary the fluid pressure drop across said second restriction accordingly; and
    means operatively connected to said flow conduit upstream from said first restriction for controlling the pressure of the fluid flow to said first restriction to maintain a predetermined pressure differential between it and the higher of said two sensed fluid pressures;
    said fluid pressure drop across said second restriction being proportional to the ratio of said two sensed fluid pressures.

2. Fluid pressure ratio sensing apparatus as claimed in claim 1 wherein:
    said flow conduit connects said source with the lower of said two sensed pressures;
    said fluid amplifier means is responsive to the higher of said two sensed fluid pressures; and
    said means for controlling the fluid pressure upstream from said first restriction includes a third restriction upstream from said first restriction and in series flow therewith, a drain passage connecting said flow conduit intermediate said first and third restrictions to a relatively lower pressure source, spring loaded valve means responsive to said upstream pressure and said second of said two sensed fluid pressures for controlling flow through said drain passage to maintain a predetermined constant fluid pressure differential between said upstream pressure and said second of said two sensed fluid pressures.

3. Fluid pressure ratio sensing apparatus as claimed in claim 1 wherein:
    said source of fluid is a gas and said two sensed fluid pressures are derived from gases.

4. Fluid pressure ratio sensing apparatus as claimed in claim 1 wherein:
    said fluid amplifier means includes a proportional acting fluid amplifier having an inlet connected to receive fluid flow from said first restriction for generating a deflectable fluid power jet, a pair of outlet ports for receiving said power jet flow in proportion to the degree of deflection thereof, and control port means pressurized by said second of said two sensed fluid pressures for deflecting said power jet; and
    a vortex type fluid amplifier having an inlet port connected to one of said pair of outlet ports, a vortex flow control port connected to the other of said pair of outlet ports, and an outlet port connected to discharge fluid to said second restriction.

5. Fluid pressure ratio sensing apparatus as claimed in claim 4 wherein:
    said control port means is defined by first and second spaced apart opposed control ports;
    a first passage communicating said first control port to said second of said two sensed fluid pressures;
    a second passage connecting said second control port to said inlet of said vortex type amplifier whereby the back fluid pressure at said inlet port resulting from said vortex flow is controlled to equal said second of said two sensed flow pressures.

6. Fluid pressure ratio sensing apparatus as claimed in claim 5 wherein:
    said proportional acting fluid amplifier has a high input impedance characteristic whereby substantially no fluid flow through said first and second control ports occurs.

7. Fluid pressure ratio sensing apparatus as claimed in claim 1 wherein:
    said fluid flow through said first and second restrictions is subsonic.

8. Fluid pressure ratio sensing apparatus as claimed in claim 7 wherein:
    said pressure differential across said restriction is equal to $K_1 (A_3/A_5)^2 P_1/P_2$ wherein $K_1$ defines a constant, $A_3$ and $A_5$ define the effective flow areas of said first and second flow restrictions, respectively, and $P_1$ and $P_2$ define said two sensed fluid pressures.

* * * * *